United States Patent [19]

Crowley et al.

[11] Patent Number: 5,171,797

[45] Date of Patent: Dec. 15, 1992

[54] WATER BORNE HERMETIC COATING

[75] Inventors: James I. Crowley, Florissant, Mo.; Ronald W. Goetter, Collinsville, Ill.

[73] Assignee: The P.D. George Company, St. Louis, Mo.

[21] Appl. No.: 801,746

[22] Filed: Dec. 3, 1991

[51] Int. Cl.$^5$ ............................................. C08F 283/00
[52] U.S. Cl. .................................... 525/489; 525/486; 525/497
[58] Field of Search .................... 525/489, 486, 497

[56] References Cited

U.S. PATENT DOCUMENTS

| | | | |
|---|---|---|---|
| 3,200,172 | 8/1965 | Renner | 525/489 |
| 4,172,193 | 10/1979 | Marx et al. | 525/489 |
| 4,374,213 | 2/1983 | Dickie et al. | 525/511 |
| 4,374,965 | 2/1983 | Dickie et al. | 525/511 |
| 4,623,680 | 11/1986 | Azarnia et al. | 523/412 |
| 4,777,194 | 10/1988 | Kempter et al. | 525/484 |
| 4,839,444 | 6/1989 | Lavallee | 525/489 |
| 4,845,162 | 7/1989 | Schmitt et al. | 525/497 |

Primary Examiner—Melvyn I. Marquis
Assistant Examiner—Randy Gulakowski
Attorney, Agent, or Firm—Sidney B. Ring

[57] ABSTRACT

An hydrolytically stable, heat-curable composition useful as an hermetic varnish for electrical conductors comprising an aqueous solution with or without organic co-solvents of:

1) an adduct of an epoxide of a phenol-formaldehyde condensate and a dialkanolamine, and
2) a water-soluble curing agent comprising both a phenoplast alcohol and an aminoplast such as a melamine for example, hexamethoxymethylmelamine;

the cured products thereof which are useful as hermetic varnishes for electrical conductors. i.e. varnishes exposed to refrigerants such as fluorocarbons.

10 Claims, No Drawings

WATER BORNE HERMETIC COATING

BACKGROUND OF THE INVENTION

1. Field of the Invention

This invention relates to the coating of metal articles and to electrical equipment, e.g. made of copper, silver, or aluminum, such as coils, compressors, armatures, transformers, motors, and the like, with an aqueous solution of water-soluble resins that exhibits superior resistance to fluorocarbon refrigerants, to chemical attack, and has excellent hot and cold bond strengths on helical coils, both before and after exposure to fluorocarbon refrigerants.

2. The Prior Art

In the manufacture of electrical equipment for air conditioners and refrigerators where a fluorocarbon refrigerant like fluorocarbon refrigerant 22 is used, coils and their motor components are coated with an hermetic-type varnish. Varnishes of this type have a blend of an epoxy resin and a phenolic resin dissolved in a mixture of glycol ethers or esters and an aromatic hydrocarbon solvent. In the baking operation the evaporation of the glycol ether or ester and the aromatic hydrocarbon solvent poses an air pollution problem. Control of these emissions of Volatile Organic Compounds (VOCs) to the atmosphere from industrial, stationary sources has been regulated by the Environmental Protection Agency (EPA) and by various state authorities. Typical allowed emissions are 3.0 pounds per gallon of applied coating less water. Solutions of an epoxy resin and a phenolic resin in glycol ethers or esters and aromatic hydrocarbon solvents typically contain 6.0 pounds VOC per gallon of coating.

One of the approaches to solve this problem would be to formulate a water-borne coating which eliminates the use of the aromatic hydrocarbon solvent, and reduce the requirement for organic co-solvent to meet Environmental Protection Agency regulations.

Although aqueous systems having reactive carboxylic acid groups attached to epoxy esters have been proposed in the art, they have been deficient in resistance to refrigerants and bond strengths have been low. The products are hydrolytically unstable in the liquid and cured states. Emulsions of epoxy resins have posed rheological problems and their storage stability is limited.

Examples of hermetic varnishes are disclosed in U.S. Pat. Nos. 4,433,080 and 4,454,197, which employ adducts of dihydric phenols and p-Aminobenzoic acid. These adducts are dispersed in water by means of volatile amines which form a quaternary ammonium compound, rendering them water soluble with the addition of an organic co-solvent. The resulting dispersions are too viscous to be applied above 32 weight percent solids, and they typically contain more than 3.0 pounds per gallon VOC. Additionally, because of the residual carboxylic acid groups which remain in the cured compositions after the quaternizing amine has been evaporated during curing, they exhibit poorer bond strengths after exposure to fluorocarbon refrigerants than before. In addition, this type of hermetic varnish requires extended curing cycles (e.g., 4 hours at 150° C. or 2 hours at 163° C.) to develop acceptable hot bond strengths, due to the need to evaporate the amine before curing can proceed to completion.

U.S. Pat. No. 3,367,991, which does not relate to hermetic varnishes, discloses adducts of epoxides of Bisphenol A cured with hexamethoxymethyl melamine curing agents, unlike the present invention which employs the combination of phenoplast alcohol and melamine-formaldehyde condensate.

U.S. Pat. No. 3,729,435 which does not relate to hermetic varnishes, relates to epoxy resins modified with dialkanolamines which are further modified with fatty acids and a polycarboxylic acid followed by mixing with aminoplasts or phenoplasts.

U.S. Pat. Nos. 4,374,233 and 4,374,965, which do not relate to hermetic varnishes, disclose epoxy/amine adducts crosslinked with aminoplasts.

U.S. Pat. No. 4,777,194 which does not relate to hermetic varnishes, relates to epoxy/amine adducts further modified by an amide-forming reaction in combination with a phenoplast.

SUMMARY OF THE INVENTION

We have invented novel, one-package epoxy adduct coating compositions which are hydrolytically stable for extended periods, have good rheology, low fluorocarbon refrigerant extractible matter, high hot and cold bond strengths, high bond strengths after exposure to fluorocarbon refrigerants, low viscosity, and low VOC content. These water-soluble compositions provide clear baked films for hermetic motors and other electrical equipment.

The present invention relates to the adducts of epoxides of phenol-formaldehyde resins and dialkanolamines which can be cured with a water-soluble combination of aminoplasts such as a melamine resin and phenoplast alcohol. The cured compositions are useful as hermetic varnishes.

The reactants are ideally represented by the following formulas:

Formula I Epoxide phenol-formaldehyde resins

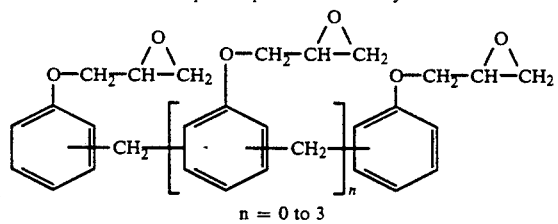

n = 0 to 3

Formula II Dialkanolamine

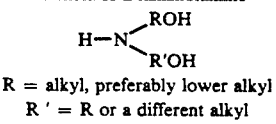

R = alkyl, preferably lower alkyl
R' = R or a different alkyl

Formula III Melamine aminoplasts

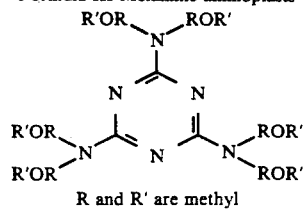

R and R' are methyl

Formula IV Phenoplast alcohol

-continued

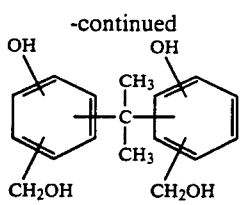

In addition Bisphenol A type, Bisphenol F type, and epoxy cresol novolac resins may also be employed for the Formula I component of the invention.

DESCRIPTION OF THE PREFERRED EMBODIMENTS

The preferred epoxide resins I are also known as novolacs, specifically epoxy phenol novolacs. The preferred epoxide resin is where n=1.6. The preferred alkanolamine is diethanolamine. The preferred aminoplast resin is a melamineformaldehyde resin such as hexamethoxymethylmelamine. The preferred phenoplast alcohols are those from the reaction of Bisphenol A and formaldehyde based on the moles of Bisphenol A to formaldehyde of about 1:3.5 to about 1:2.5.

EPOXY-AMINE ADDUCT

A dialkanolamine is charged into a three-necked boiling flask equipped with mechanical agitation, inert gas, a thermometer, and a water condenser. This material was heated to 135° C. with agitation under an inert gas blanket.

A premixed solution of an epoxy resin and a glycol ether was heated to approximately 65° C. and added to the dialkanolamine over a period of two hours maintaining a temperature of 135° C.

The reaction was continued until the epoxide content was zero. The sample was then cooled to 95° C. and diluted with water.

WATER-SOLUBLE PHENOL ALCOHOL

Bisphenol A, formalin solution, and a tri-substituted amine were charged to a three-necked boiling flask equipped with mechanical agitation, water condenser, thermometer, inert gas, and vacuum distillation capability.

The reaction was heated under an inert gas blanket with stirring to 65° C. and held for two hours. Vacuum distillation was then started and 125 torr at 40° C. was achieved. Water was removed until a temperature of 60° C. was reached at 125 torr. Sample was then cooled with no additional dilution necessary.

COSOLVENTS

In the electroinsulation area where a varnish is employed by a dipping process or the Zanderol (roll through) method to coat a coil or armature, e.g. of copper, the rheology of the system is different from the roller coat or spray operation whereby flat metal sheets or can ends or bodies are coated.

The type of metal substrate is also different in the electrical area as opposed to the beverage cans and other metal decorating areas. In coating armatures or coils of enamelled wire the substrate, shape of article, immersion conditions and dip tank stability requirements are vastly different than for beverage cans.

In screening various varnishes on bare copper strips or panels and on enamelled helical coils, the cosolvents employed with water are very important and critical in obtaining a smooth, continuous baked film that is devoid of pinholes, blisters and craters.

Low-boiling cosolvents having a boiling point lower than about 150° C., such as methoxymethanol or ethoxyethanol, alone or in combination with alcohols, such as ethyl or isopropyl alcohol provide varnishes whose baked films exhibit pinholes and blisters.

Higher boiling cosolvents, those with a boiling point greater than 150° C., provide smooth, continuous baked films. Blends of glycol ethers having boiling points above and below 150° C. may be utilized whereby the lower ones are present percentagewise not greater than about 35% and preferably not greater than 30%.

Suitable cosolvents are glycol ethers, diethers, glycol ether esters and ketones. Examples of glycol ethers are: butoxyethanol, butoxypropanol, methoxydipropanol, ethoxydiethanol, butoxydiethanol, methoxydipropanol, ethoxydipropanol and methoxytripropanol. Glycol ethers with boiling points less than 150° C. that may be blended with the higher boiling one are: methoxyethanol, ethoxyethanol, methoxypropanol, ethoxypropanol, propoxyethanol and propoxypropanol. Examples of a glycol ether acetate are: methoxyethylacetate, ethoxyethylacetate and ethoxyethoxyethylacetate. Examples of diethers are: dimethyl and diethyl ethers of diethylene glycol. Examples of ketones or ketone alcohols are: diacetone alcohol, 4-methoxy-4-methyl-2-pentanone and 4-methoxy4-methyl-2-pentanol.

In evaluating a coating of this type as an hermetic varnish, the important criteria are hot and cold bond strengths, percentage fluorocarbon refrigerant extractibles, and retention of bond strength after fluorocarbon refrigerant exposure. Bond strength minimum values have been set at 30 lbs. at 25° C. and 10 lbs. at 150° C. for a cured film of two thousandths of an inch thickness, applied in two coats of one thousandth per coat over a helical coil of 18 AWG copper wire previously enamelled as per NEMA MW 74-C. The maximum fluorocarbon refrigerant extractibles have been set at 0.25%.

The coating compositions can contain other well-known adjuvants, such as surfactants for wetting, levelling and flow control. The coating compositions as described are clear solutions, but they can be pigmented or dyed where so desired.

The water-soluble coatings can be applied to a variety of metal substrates, but for the purposes of this invention are applied to copper strips or preferably previously coated copper wire wound into helical coils to test for bond strengths.

Fluorocarbon refrigerant extractibles are determined by coating bare 18 AWG copper coils with the varnish, baking the coating at 150° C. for one hour to produce a cured film of one thousandth of an inch film thickness, repeating the coating and curing operation to yield a total film thickness of two thousandths of an inch. Subsequent to curing, the percent fluorocarbon refrigerant extractibles is determined by testing in accordance with NEMA RE 2-1987.

Bond strength after fluorocarbon refrigerant exposure is determined after the helical coil has been tested for extractibles as per NEMA RE 2-1987. The helical coil is then baked for an additional two hours @150° C. The helical coil bond strength is measured at 25° C., as per ASTM D 2519.

The following examples are presented for purposes of illustration, and not of limitation.

EXAMPLE 1

EPOXY-AMINE ADDUCT I

To a round-bottomed, three-necked boiling flask equipped with a thermometer, mechanical agitation, inert gas sparge and a water condenser, was charged:

Diethanolamine: 294.62 grams (2.80 moles)

The material was heated and stirred under Nitrogen to 135° C., at which point was added, as a solution held at 65° C.:

DEN 438 (1): 477.00 grams (EEW 178.5)
Butyl Propasol(2): 53.00 grams (0.40 moles)

1) Trademark of Dow Chemical Company: epoxy novolac, n = 1.6 (Formula I)
2) Trademark of Union Carbide Corporation: Butoxypropanol The addition was carried out over 120 minutes, while maintaining a temperature of 135° C., until the epoxide content was essentially nil. The clear, homogeneous solution was cooled to 95° C., and diluted by the addition of:

Water: 718.62 grams. (39.92 moles)

The resulting solution was clear, and had the following physical properties:

Viscosity @30° C.: 400 cP
Non-volatile Matter: 49.35%

EXAMPLE 2

WATER-SOLUBLE PHENOPLAST ALCOHOL I

To a round-bottomed, three-necked boiling flask equipped with thermometer, mechanical agitation, inert gas sparge, water condenser, and equipped for vacuum distillation, was charged:

Bisphenol A: 1653.5 grams (7.24 moles)
37 % Formalin: 1763.8 grams (21.75 moles)
Triethylamine: 82.7 grams (0.82 moles)

The mixture was heated and stirred to 65° C., where it was held for two hours. After two hours, vacuum distillation was begun. The temperature dropped to 40° C. at 125 torr. Vacuum distillation was continued until sufficient water was removed to raise the temperature to 60° C. at a pressure of 125 torr, at which time heating and vacuum distillation were discontinued.

Yield was 3240 grams, at 66.13 % Non-volatile matter.

EXAMPLE 3

EPOXY-AMINE ADDUCT II

To a round-bottomed, three-necked boiling flask equipped with a thermometer, mechanical agitation, inert gas sparge and a water condenser, was charged:

Diethanolamine: 345.45 grams (3.29 moles)

The material was heated and stirred under Nitrogen to 135° C., at which point was added, as a solution held at 65° C.:

DEN 438(1): 618.18 grams (EEW 178.5)
Butyl Propasol(2): 68.69 grams (0.52 moles)

The addition was carried out over 120 minutes, while maintaining a temperature of 135° C., until the epoxide content was essentially nil. The clear, homogeneous solution was cooled to 95° C., and reduced by the addition of:

Water: 931.31 grams. (51.74 moles)

The resulting solution was clear, and had the following physical properties:

Viscosity @25° C.: 748 cP
Non-volatile Matter: 49.49%

EXAMPLE 4

WATER-SOLUBLE PHENOPLAST ALCOHOL II

To a round-bottomed, three-necked boiling flask equipped with thermometer, mechanical agitation, inert gas sparge, water condenser, and equipped for vacuum distillation, was charged:

Bisphenol A: 1039.35 grams (4.55 moles)
91% Paraformaldehyde: 409.80 grams (12.43 moles)
Triethylamine: 47.26 grams (0.47 moles)

The mixture was heated and stirred to 65° C., where it was held for two hours. After two hours, vacuum distillation was begun. The temperature dropped to 40° C. at 125 torr. Vacuum distillation was continued until sufficient water was removed to raise the temperature to 60° C. at a pressure of 125 torr, at which time heating and vacuum distillation were discontinued.

Yield was 2008 grams at 71.1% Non-volatile matter.

Examples 5 and 6 are comparative examples, outside the scope of the invention, in that they do not contain both phenoplast alcohol and an aminoplast as co-crosslinking agents.

Examples 7 through 14 illustrate the scope of the invention. They are prepared by mixing the ingredients together at room temperature to prepare a varnish.

The aforementioned varnish is evaluated for fluorocarbon refrigerant resistance and bond strength as per NEMA Standard RE 2-1987 and ASTM D 2519. These results are summarized in Tables 1 and 2.

TABLE I

PARTS BY WEIGHT

| | COMMERCIAL (1) SOLVENT-BORNE | COMMERCIAL (2) WATER-BORNE | Comparative Example 5 | Comparative Example 6 | Example 7 | Example 8 |
|---|---|---|---|---|---|---|
| EPOXY ADDUCT I | | | 80.34 | 49.97 | 79.14 | 78.61 |
| PHENOL ALCOHOL I | | | 19.66 | | 19.36 | 19.29 |
| EPOXY ADDUCT II | | | | | | |
| PHENOL ALCOHOL II | | | | 50.03 | | |
| WATER | | | 84.88 | 66.89 | 83.64 | 83.14 |
| BUTYL PROPASOL | | | 5.50 | 3.43 | 5.42 | 5.40 |
| CYMEL 303 (3) | | | | | 1.50 | 2.10 |
| 2-BUTOXY ETHANOL | | | 17.83 | 38.25 | 17.57 | 17.46 |
| PHOSPHORIC ACID | | | 1.20 | 0.29 | 1.17 | 1.16 |
| BYK 306 (4) | | | 0.63 | 0.04 | 0.63 | 0.62 |
| TOTAL | | | 210.04 | 208.90 | 208.43 | 207.78 |

| | Example 9 | Example 10 | Example 11 | Example 12 | Example 13 | Example 14 |
|---|---|---|---|---|---|---|

TABLE I-continued

| PARTS BY WEIGHT | | | | | | |
|---|---|---|---|---|---|---|
| EPOXY ADDUCT I | 65.61 | | 52.83 | 12.85 | 27.25 | 30.35 |
| PHENOL ALCOHOL I | | | | | | |
| EPOXY ADDUCT II | | 65.19 | | | | |
| PHENOL ALCOHOL II | 32.38 | 32.78 | 26.08 | 82.02 | 68.22 | 56.28 |
| WATER | 74.26 | 76.34 | 59.81 | 45.30 | 53.11 | 51.15 |
| BUTYL PROPASOL | 4.50 | 4.65 | 3.62 | 0.88 | 1.88 | 2.08 |
| CYMEL 303 (3) | 2.01 | 2.03 | 21.09 | 5.13 | 4.53 | 13.37 |
| 2-BUTOXY ETHANOL | 27.46 | 27.80 | 22.10 | 62.68 | 60.60 | 50.62 |
| PHOSPHORIC ACID | 2.16 | 2.18 | 1.72 | 0.42 | 0.28 | 0.24 |
| BYK 306 (4) | 1.09 | 0.27 | 0.22 | 0.06 | 0.02 | 0.02 |
| TOTAL | 209.47 | 211.24 | 187.47 | 209.34 | 215.89 | 204.11 |

(1) Pedigree 923-50 Hermetic Epoxy, P. D. George Co.
(2) Schenectady Chemicals Isopoxy 800, U.S. Pat. Nos. 4,433,080 and 4,454,197
(3) Liquid hexamethoxymethyl Melamine, American Cyanamid Co.
(4) Polyether-modified Dimethyl Polysiloxane, Byk Chemie

TABLE II

| RESULTS | COMMERCIAL (1) SOLVENT-BORNE | COMMERCIAL (2) WATER-BORNE | Comparative Example 5 | Comparative Example 6 | Example 7 | Example 8 |
|---|---|---|---|---|---|---|
| FREON EXTRACTIBLES | 0.40% | 0.18% | 2.88% | 0.14% | 0.71% | 0.34% |
| BOND AFTER EXTRACTION | 4.5# | 1.8# | 10.6# | 3.9# | 30.4# | 29.2# |
| BOND @ 25° C. | 35.0# | 60.0# | | 45.8# | | |
| BOND @ 150° C. | 7.0# | 6.0# | | 6.8# | | |
| VISCOSITY @ 25° C. | 900 cP | 600 cP | 144 cP | 112 cP | 137 cP | 140 cP |
| N.V.M. | 50.00% | 32.00% | 47.60% | 45.80% | 49.90% | 49.50 |
| VOC #/GAL | 6.00 | 4.50 | 1.80 | 2.90 | 1.50 | 1.70 |

| | | Example 9 | Example 10 | Example 11 | Example 12 | Example 13 | Example 14 |
|---|---|---|---|---|---|---|---|
| | FREON EXTRACTIBLES | 0.22% | 0.25% | 0.19% | 0.14% | 0.07% | 0.05% |
| | BOND AFTER EXTRACTION | 20.9# | 9.9# | 11.3# | 60.0# | 26.8# | 27.8# |
| | BOND @ 25° C. | | 37.7# | 50.6# | 46.1# | 52.9# | 51.7# |
| | BOND @ 150° C. | | 2.3# | 15.0# | 35.6# | 34.0# | 23.7# |
| | VISCOSITY @ 25° C. | 119 cP | 137 cP | 134 cP | 90 cP | 80 cP | 74 cP |
| | N.V.M. | 48.70% | 50.60% | 52.00% | 50.90% | 47.20% | 45.90% |
| | VOC #/GAL | 2.20 | 1.90 | 2.10 | 3.00 | 2.90 | 3.00 | represents Pounds

EXPLANATION OF TABLES 1 AND 2

The resulting tables illustrates the importance of the combination of phenoplast alcohol and aminoplast to achieve the desirable results of low fluorocarbon refrigerant extractible as well as high bond strength after fluorocarbon refrigerant exposure. The table shows a relative comparison between a commercial waterborne system manufactured by Schenectady Chemical (Isopoxy 800), a solvent - borne system manufactured by The P. D. George Company (923-50), and various ratios of intermediates of the new invention.

The commercial solvent-borne varnish yields a higher viscosity as well as higher VOC amounts than the new invention, The commercial waterborne product produced by Schenectady also yields higher viscosity at a lower NVM content and VOC results which are higher than the new invention. The bond after fluorocarbon refrigerant exposure is also much lower than the new waterborne system claimed in this patent.

Specific examples that vary the ratios of intermediates are illustrated in Table III and also supports the claim that the combination of the phenoplast and aminoplast resins is necessary to achieve optimum results. Examples 5 and 6 are formulas that were made without the phenoplast alcohol- aminoplast combination. Example 5 shows a bond after extraction result that is reasonable but the fluorocarbon refrigerant extractible result is not at the acceptable level of 0.5% or less. Example 6 uses a different phenoplast which seems to improve the fluorocarbon refrigerant extractible result but does not show a significant increase in the bond after fluorocarbon refrigerant exposure result compared to products already available. Example 7 begins to show the effect of the phenoplast alcohol - aminoplast combination as it relates to fluorocarbon refrigerant extractible and bond after exposure results. Examples 7 and 8 are very close in composition with example 8 showing a slightly higher level of aminoplast modification with a corresponding drop in the fluorocarbon refrigerant extractible value. Example 9 uses a different phenoplast alcohol which begins the trend of even lower fluorocarbon refrigerant extractible results that is documented throughout the rest of the table. As the ratios are modified the phenoplast alcohol- aminoplast combination effects are seen in fluorocarbon refrigerant extractible results that go as low as 0.05% and bond strength after fluorocarbon refrigerant exposure achieving a maximum value of 60 lbs. Examples 10–14 also show a tendency towards high bond strength before fluorocarbon refrigerant exposure at 25° and 150° C.

The low viscosity at 45–50% NVM is another aspect of the current invention that not only makes it unique compared to other commercially available varnishes, but also allows for better results in the actual application to the areas of use as claimed within this patent. This ease of application is facilitated by the use of polysiloxane compounds as flow additives which allow a smooth film to be formed with a rapid curing schedule.

The following Table III presents the ratio of reactants, broad, intermediate and preferred.

TABLE III

| RATIO | BROAD | INTERMEDIATE | PREFERRED |
|---|---|---|---|
| EPOXY NOVOLAC TO DIALKANOLAMINE (MOLES) | 0.9 TO 1.1 | 0.95 TO 1.05 | 1.0 TO 1.0 |
| EPOXY EQUIVALENT WEIGHT OF EPOXY NOVOLAC | 170 TO 5000 | 170 TO 500 | 170 TO 235 |
| AMINOPLAST AS A WEIGHT PERCENT OF ACTIVE INGREDIENTS | 0.1 TO 50.0 | 1.0 TO 25.0 | 2.0 TO 21.0 |
| PHENOPLAST ALCOHOL AS A WEIGHT PERCENT OF ACTIVE INGREDIENTS | 0.1 TO 1000 | 10 TO 90 | 30 TO 80 |
| WEIGHT RATIO OF EPOXY ADDUCT TO PHENOPLAST ALCOHOL TO AMINOPLAST | 80:19:1 TO 5:70:25 | 60:39:1 TO 5:74:21 | 58:40:2 TO 14:65:21 |
| ORGANIC SOLVENT WEIGHT PERCENT OF TOTAL | 1 TO 90 | 10 TO 34 | 10 TO 20 |
| BISPHENOL A TO FORMALDEHYDE IN PHENOPLAST ALCOHOL (MOLES) | 1:3.5 TO 1:2.5 | 1:3.0 TO 1:2.5 | 1:2.75 |

What is claimed is:

1. An hydrolytically stable, heat-curable composition suitable for use as an hermetic varnish for electrical wires which comprises an aqueous solution of an adduct of:
    (1) a phenol-aldehyde epoxide, and
    (2) a dialkanolamine,
    (3) and both water soluble amino-formaldehydes and phenol-formaldehydes as cross-linking agents, and
    (4) from about 0 to 90% of a water-soluble cosolvent.
2. The composition of claim 1 where
    (1) the phenol-aldehyde epoxide is a novolac resin with an epoxide equivalent weight of about 170 to 5000,
    (2) the amine is diethanolamine,
    (3) the amino-formaldehyde is hexamethoxymethylmelamine.
3. The composition of claim 2 where
    (1) the phenol-aldehyde epoxide is

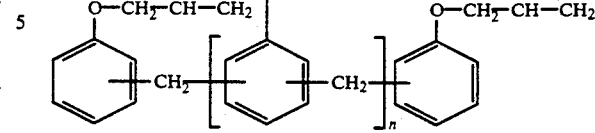

n=0 to 3
(2) Hexamethoxymethylamine of the formula

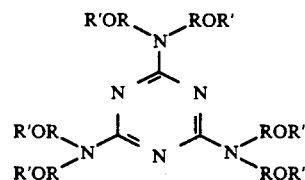

where R and R' are methyl
(3) the phenol-formaldehyde is

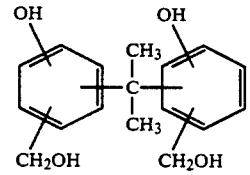

4. Claim 3 where the phenol-formaldehyde is made by reacting Bisphenol A with formaldehyde.
5. Claim 4 where
    (1) the weight ratio of the phenol-formaldehyde epoxide adduct to phenol-formamide to hexamethylmelamine is from about 80:19:1 to about 5:70:25, and
    (2) the phenol-formaldehyde is made from Bisphenol A to formaldehyde ratios of about 1:3.5 to about 1:2.5, based on moles.
6. The cured product of claim 1 which is capable of use as an hermetic varnish.
7. The cured product of claim 2 which is capable of use as an hermetic varnish.
8. The cured product of claim 3 which is capable of use as an hermetic varnish.
9. The cured product of claim 4 which is capable of use as an hermetic varnish.
10. The cured product of claim 5 which is capable of use as an hermetic varnish.